(12) United States Patent
Laporte et al.

(10) Patent No.: US 7,328,947 B2
(45) Date of Patent: Feb. 12, 2008

(54) VEHICLE SEAT BACKREST SUITABLE FOR ALLOWING THE ATTACHMENT OF A CHILD SEAT AND VEHICLE SEAT COMPRISING SUCH A BACKREST

(75) Inventors: Alain Laporte, Guyancourt (FR); Stephan Fomperine, Boissy St Leger (FR); Augusto Da Costa, Etrechy (FR)

(73) Assignee: FAURECIA Sieges d'Automobile, Nanterre (FR)

( * ) Notice: Subject to any disclaimer, the term of this patent is extended or adjusted under 35 U.S.C. 154(b) by 248 days.

(21) Appl. No.: 11/089,827

(22) Filed: Mar. 25, 2005

(65) Prior Publication Data
US 2005/0225138 A1 Oct. 13, 2005

(30) Foreign Application Priority Data
Mar. 26, 2004 (FR) .................................. 04 03170

(51) Int. Cl.
*B60N 2/28* (2006.01)
(52) U.S. Cl. ..................................................... 297/254
(58) Field of Classification Search ................ 297/253, 297/254, 463.1
See application file for complete search history.

(56) References Cited
U.S. PATENT DOCUMENTS 2,978,015 A * 4/1961 Cox ............................ 297/485
3,157,432 A * 11/1964 Watkins ....................... 297/254
6,095,604 A 8/2000 Stack et al.
6,196,628 B1 * 3/2001 Goy et al. .................... 297/253
6,234,572 B1 * 5/2001 Shiino et al. ................ 297/253
6,267,442 B1 7/2001 Shiino et al.
6,485,055 B1 * 11/2002 Swayne et al. ........... 280/801.1
6,491,346 B1 * 12/2002 Gupta et al. ........... 297/452.65
6,666,504 B2 * 12/2003 Guanzon et al. ............. 296/222
6,736,456 B2 * 5/2004 Okamoto et al. ........... 297/336
6,869,141 B2 * 3/2005 Yamaoka et al. ........... 297/253

FOREIGN PATENT DOCUMENTS

EP 1 393 966 A 3/2004
FR 2 768 090 3/1999

* cited by examiner

*Primary Examiner*—Joe Edell
(74) *Attorney, Agent, or Firm*—Mashall, Gerstein & Borun LLP

(57) ABSTRACT

A vehicle seat backrest suitable for allowing the attachment of a child seat, the backrest comprising a rigid structure and an anchoring system comprising an anchor rod to permit to a coupling member belonging to the child seat to be anchored on the anchor rod via the rear face of the rigid structure. The anchoring system comprises a rigid plate comprising retainer suitable for retaining the anchor rod by abutment contact when the coupling member of the child seat exerts forces on the said anchor rod.

12 Claims, 4 Drawing Sheets

VEHICLE SEAT BACKREST SUITABLE FOR ALLOWING THE ATTACHMENT OF A CHILD SEAT AND VEHICLE SEAT COMPRISING SUCH A BACKREST

FIELD OF THE INVENTION

The present invention relates to backrests for vehicle seats suitable for allowing the attachment of a child seat and to vehicle seats comprising such backrests.

BACKGROUND OF THE INVENTION

More particularly, the invention concerns, amongst these backrests, those that comprise a rigid structure having a front face and a rear face, the rigid structure being provided with a through hole delimited by a contour and an anchoring system comprising an anchor rod disposed on the side of the front face of the rigid structure, the anchor rod extending across the through hole in order to permit to a coupling member belonging to the child seat to be anchored on the anchor rod via the rear face of the rigid structure.

These vehicle seat backrests are particularly suitable for allowing the attachment in removable manner of child seats comprising three anchor points. Two of these anchor points are usually situated on the bottom portion of the child seat, and these two anchor points are intended to be inserted between the padding of the squab and the padding of the backrest to be clipped or anchored to anchorages secured to the vehicle floor or to the rigid structure of the vehicle seat. The third anchor point is, for its part, formed by a hook belonging to a strap attached to the top portion of the child seat. This third anchor point is anchored to the anchor rod having two ends which are directly welded onto the front face of the rigid structure of the backrest and more particularly onto the contour of the through hole of the rigid structure. Naturally, in this case, the padding intended to cover the rigid structure of the vehicle seat backrest has, in its rear portion, a recess allowing the hook to be anchored to the anchor rod when the child seat is attached to the vehicle seat backrest.

Nevertheless, this anchoring system only formed by the anchor rod whose two ends are directly welded to the rigid structure of the backrest does not give full satisfaction because these spot welds which are only located onto the ends of the anchor rod may be insufficient to retain the hook of the strap when the child seat exerts heavy stresses on the said anchor rod situated on the rear face of the vehicle seat backrest.

OBJECTS AND SUMMARY OF THE INVENTION

The purpose of the invention is to remedy the aforementioned disadvantages by simple, effective and low-cost means.

For this purpose, according to the invention, in a vehicle seat backrest of the aforementioned type, the anchoring system also comprises a rigid plate provided with an opening, the said plate being attached to the front face of the rigid structure and against the contour of the through hole so that the opening of the plate is disposed opposite the through hole of the rigid structure to allow the passage of the coupling member of the child seat, the anchor rod which is fitted onto the rigid plate extends across the opening to interact with the coupling member of the child seat, and the rigid plate comprises retention means suitable for retaining the anchor rod by abutment contact when the coupling member of the child seat exerts forces on the said anchor rod.

Thanks to these arrangements, the anchoring system according to the invention can be used to perfectly restrain the child seat in the event of heavy stresses because the anchor rod is directly held on the rigid plate placed on the front face of the rigid structure, this anchor rod furthermore being retained by abutment contact against retention means belonging to the rigid plate when the anchoring member of the child seat exerts traction forces on the said anchor rod.

In preferred embodiments of the backrest, according to the invention, it may also, where necessary, be possible to have recourse to one and/or other of the following arrangements:

- the retention means of the rigid plate protrude from the front face of the rigid structure;
- the retention means and the rigid plate are formed of a single piece;
- the retention means have the form of curved portions of the rigid plate;
- the anchor rod is attached to the rigid plate by means of attachment points which do not participate in the acceptance of forces in the event of stresses exerted by the coupling member of the child seat upon the said anchor rod;
- the anchoring system also comprises a protective element substantially funnel-shaped which has a cavity with a bottom provided with a slot in which the anchor rod is housed when the protective element is inserted into the through hole of the rigid structure via its rear face;
- the protective element comprises retention members suitable for being attached to attachment members of the rigid plate when the said protective element is inserted into the through hole of the rigid structure via its rear face; and
- the rigid plate is attached to the front face of the rigid structure by welding or screwing.

Furthermore, a further subject of the invention is a vehicle seat comprising a squab and a backrest as defined hereinabove.

BRIEF DESCRIPTION OF THE DRAWINGS

Other features and advantages of the invention will appear during the following description of one of its embodiments, given as a non-limiting example, with respect to the attached drawings.

In the drawings.

MORE DETAILED DESCRIPTION

In the various figures, the same reference numbers indicate identical or similar elements.

Figure 1:
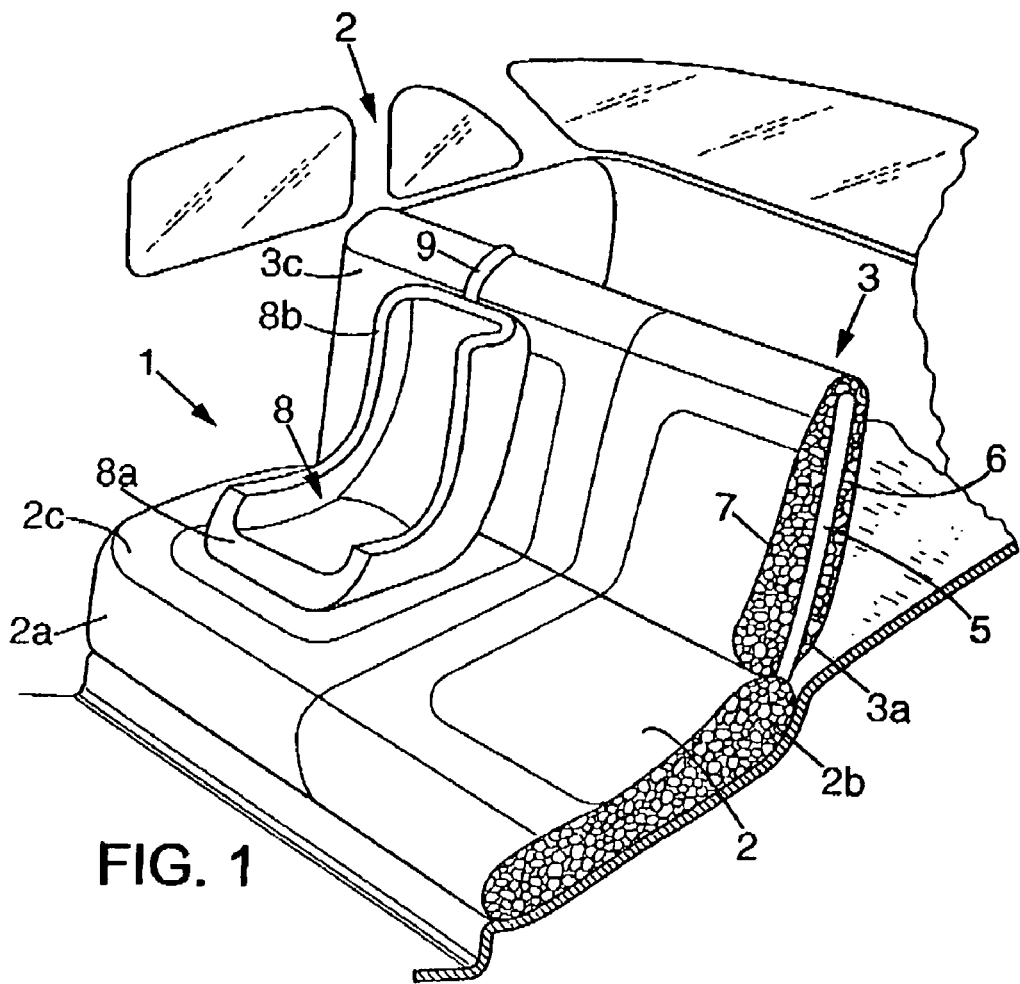
FIG. 1 represents a schematic view in perspective of a vehicle seat formed by a vehicle rear bench seat to which a child seat is fitted.
Figure 2:
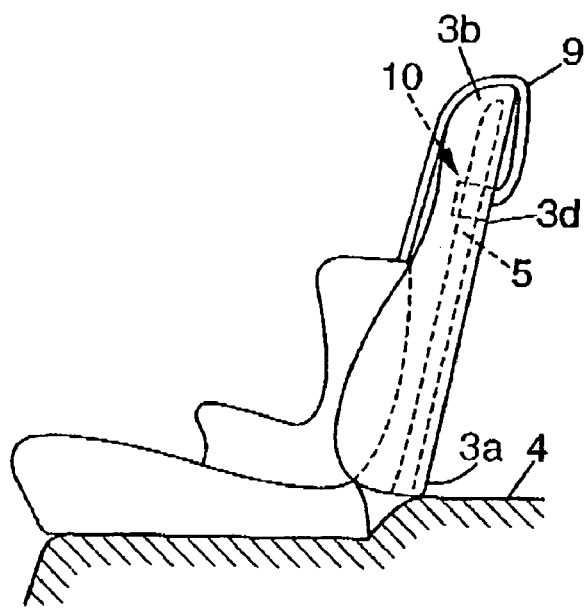
FIG. 2 is a side view of the rear bench seat of FIG. 1 fitted with the child seat.

FIGS. 1 and 2 represent a seat 1 of a vehicle 2 which, in the example considered here, consists of a rear bench seat which rests on the floor 4 of the vehicle. This rear bench seat 1 comprises a seat 2 which extends in a longitudinal direction of the vehicle between a front end 2a and a rear end 2b close to a backrest 3 disposed substantially vertical to the seat 2. This backrest 3 extends between a bottom end 3a close to the rear end 2b of the seat and a top end 3b. This backrest 3 mainly comprises a rigid structure 5 which is covered with a padding 6, itself covered by a trim cover 7 made of cloth, leather or other.

Furthermore, as shown in FIGS. 1 and 2, the rear bench seat 1 is adapted to support a child seat 8 having a bottom portion 8a forming a seat and a top portion 8b forming a backrest. This child seat 8 comprises, at its junction between the bottom portion 8a and top portion 8b, latching means (not shown) known per se and complying with the "ISOFIX" standard which is usually in the form of feet extending rearwards and intended to pass between the rear end 2b of the seat 2 and the bottom end 3a of the backrest, to be attached to anchoring rings also complying with the "ISOFIX" standard and secured to the floor 4 of the vehicle.

The child seat 8 therefore rests on the top face 2c of the seat 2 and on the front face 3c of the backrest 3.

Figure 6:
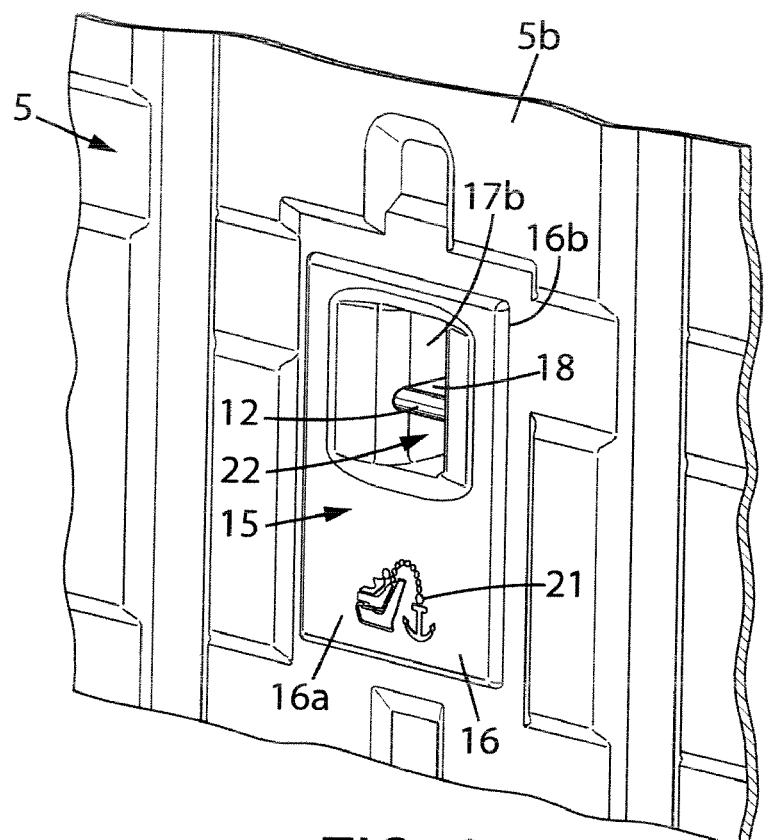
FIG. 6 is a partial view of the rear face of the rigid structure of the backrest fitted with the anchoring system according to the invention.
Figure 7:
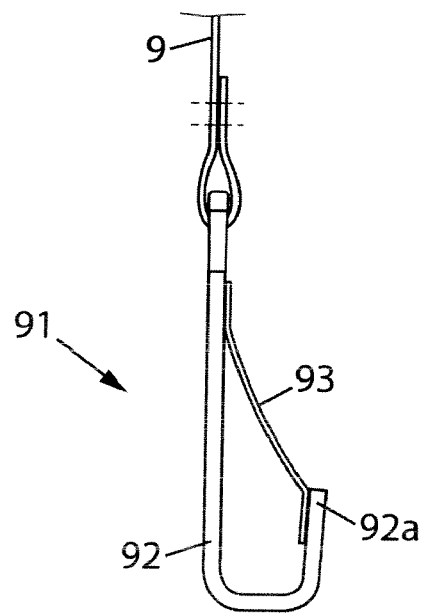
FIG. 7 is a side schematic view of an embodiment of the anchoring member belonging to the child seat.

Furthermore, this child seat 8 also comprises at its top portion 8b, a strap 9 which passes beneath the top end 3b of the backrest so as then to be attached to the rigid structure 5 of the backrest 3 at its rear face 3d (see FIG. 2). For this purpose, the free end of the strap 9 comprises a coupling member such as a hook 91 (FIG. 7) which is intended to be anchored to an anchoring system 10 according to the invention and directly fitted onto the rigid structure 5 of the backrest 3. This hook 91 may comprise a metallic blade 92 substantially J shaped with a free end 92a which is curved. The hook 91 further comprises an elastic blade 93 which extends between a end fixed onto the metallic blade 92 and a end in contact against the free end 92a of the metallic blade to form a closed housing. In the example considered here, the rigid structure 5 has the shape of a panel which has a front face 5a and a rear face 5b (FIG. 6).

This anchoring system 10 will now be described in detail with reference to FIGS. 3 to 6.

Figure 3:
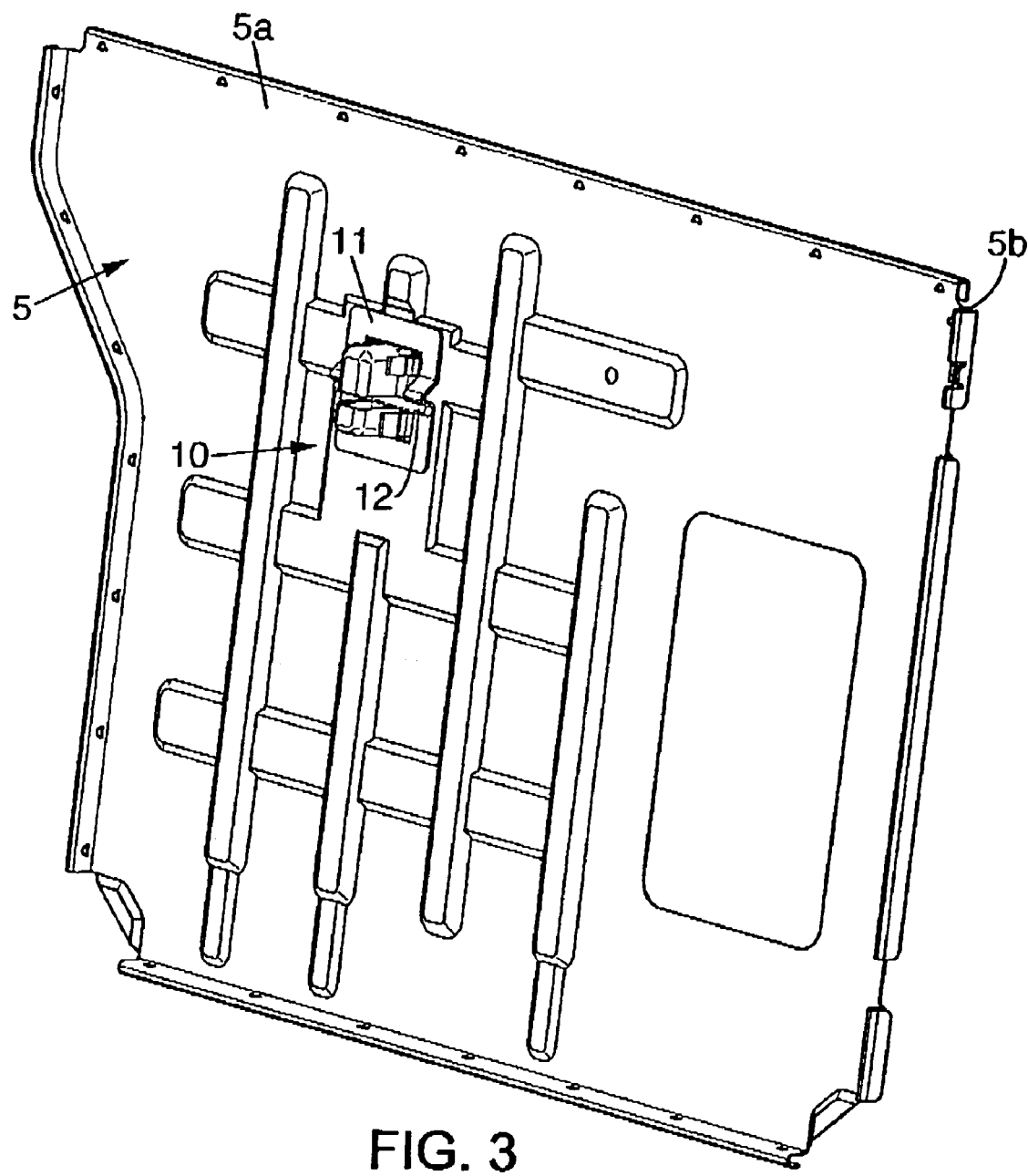
FIG. 3 is a front view of the rigid structure of the backrest fitted with an anchoring system according to the invention.

The anchoring system 10 intended to interact with the hook 91 of the strap 9 of the child seat 8 mainly comprises a rigid plate 11 and an anchor rod 12 which are fitted onto the front face 5a of the rigid structure 5 of the backrest 3 (FIG. 3).

Figure 4:
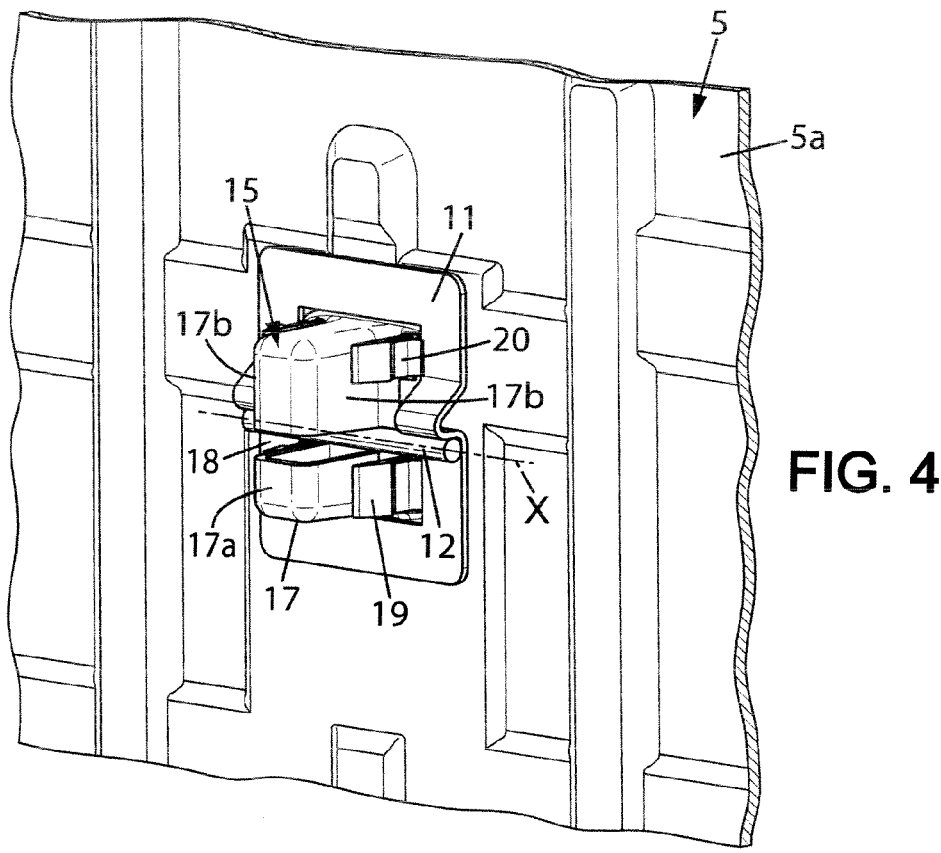
FIG. 4 is an enlarged view of FIG. 3 showing in greater detail the anchoring system according to the invention seen from the front face of the rigid structure of the backrest.
Figure 5:
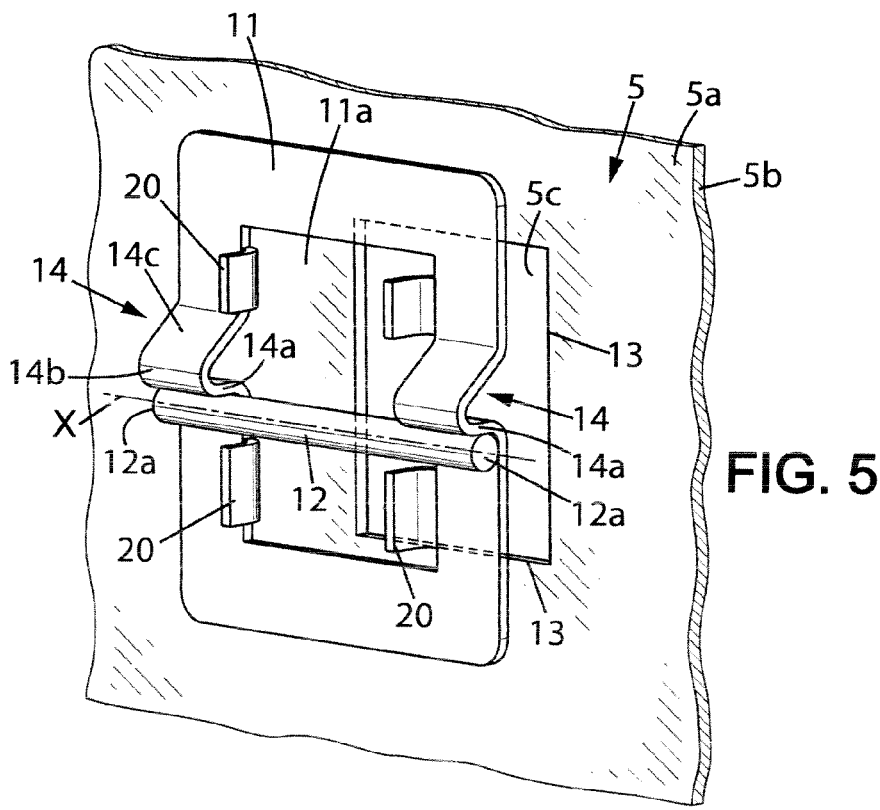
FIG. 5 is a detailed view of the rigid plate and of the anchor rod forming part of the anchoring system according to the invention.

As can be seen in greater detail in FIGS. 4 and 5, the rigid plate 11 has a central opening 11a having dimensions substantially identical to those of a through hole 5c made directly in the top portion of the rigid structure 5. The through hole 5c is delimited, at the front face 5a of the rigid structure 5, by a contour 13 to which the rigid plate 11 is attached so that the central opening 11a of the said rigid plate 11 is placed in correspondence with the through hole 5c of the rigid structure 5. The rigid plate 11 may for example be attached to the contour 13 of the through hole 5c of the rigid structure by welding, screwing or riveting. This rigid plate 11 must be firmly attached to the rigid structure 5 because, as will be seen in greater detail in the rest of the description, the said rigid plate 11 is intended to sustain all the forces that will be exerted on the anchor rod 12 by the hook of the child seat 8.

The anchor rod 12 extends, for its part, horizontally along its axis in a cross-direction X between two ends 12a which are fitted onto the rigid plate 11. These two ends 12a of the anchor rod 12 are for example located to the rigid plate 11 by spot welds (not shown) which are not intended as such to transmit the forces from the anchor rod 12 to the rigid plate 11.

As can be seen in FIG. 5, the central portion of the anchor rod extends horizontally across the opening 11a of the rigid plate 11 so that a user can anchor the hook of the strap 9 of the child seat 8 via the rear face 5b of the rigid structure 5, as shown in FIG. 6. During the anchoring of the hook 91 of the child seat 8, the elastic blade 93 of the hook 91 deforms under the action of the anchor rod 12 to allow its passage in the curved area of the metallic blade 92. The elastic blade 93 returns to its initial position in coming in contact against the free end 92a of the metallic blade 92 so that the anchor rod 12 is located in the closed housing.

In order to retain the anchor rod 12 on the rigid plate 11 in the event of heavy stresses exerted by the hook of the child seat 8, the rigid plate 11 is also provided with retention means 14, which are suitable for retaining the anchor rod 12 by abutment contact, when the hook of the child seat 8 exerts a traction directed substantially upwards and in the direction of the rear face 5b of the rigid structure 5 of the backrest 3.

These retention means 14, in the example considered here, are formed by curved portions of the rigid plate 11. Each curved portion 14 has a flat 14a which extends substantially perpendicular to the rest of the rigid plate 11 and which is prolonged by a curved zone 14b which itself continues with an inclined flat 14c. The two ends 12a of the anchor rod 12 are intended to come into abutment contact against the perpendicular flats 14a while being attached to the rigid plate 11 by means of non-load-bearing spot welds, that is to say spot welds which participate very little or not at all in the acceptance of force in the case of heavy stresses exerted by the hook of the child seat 8. The assembly thus formed by the rigid plate 11 and the anchor rod 12 which is fitted onto the front face 5a of the rigid structure 5 of the backrest 3 therefore allows a simple, secure and low-cost anchorage of the hook of the child seat 8.

As can be seen in FIGS. 4 and 6, the anchoring system 10 according to the invention may also comprise a protective element 15 intended to be inserted into the anchoring system 10 via the rear face 5b of the rigid structure 5 (FIG. 6). This funnel-shaped protective element 15 comprises a hollow plug 17 delimiting a cavity 22 which extends, towards the front of the vehicle, to a bottom 17a provided with a slot 18 in which the anchor rod 12 is intended to be housed when the protective element 15 is inserted into the through hole 5c of the rigid structure 5.

This hollow plug 17 also extends towards the rear of the vehicle, to a plate 16 which has a rear face 16a and a front face 16b disposed resting against the rear face 5b of the rigid structure 5 of the backrest 3. The plug 17 of the protective element 15 therefore has smaller dimensions than the dimensions of the through hole 5c of the rigid structure 5 and of the opening 11a of the rigid plate 11 so as to allow its insertion into the anchoring system 10 while allowing the anchor rod 12 to be housed in the slot 18 of the plug 17.

To attach the protective element 15 to the anchoring system 10, the rear face 16b of the plate 16 partly forming the protective element 15 comprises retention members 19 (FIG. 4) suitable for being attached to attachment members 20 made on the rigid plate 11. As an example, these attachment members 20 of the rigid plate 11 may be made from folded portions of the rigid plate 11 made at the limit of the opening 11a, these pressed or bent portions 20 then serving as a support for the retention members 19 of the protective element 15. These retention members 19 may then take the shape of elastically deformable clips provided with a shoulder intended to be clipped onto the free ends of the bent portions 20 of the rigid plate 11.

Thus, as can be seen in FIG. 6, when the protective element 15 is fitted to the anchoring system 10 via the rear face 5b of the rigid structure 5, the opening 5c made in the rigid structure 5 is partly blocked off by the hollow plug 17 except at the slot 18. This hollow plug 17 is therefore used to prevent the ingress of various objects such as dust or other in the through hole 5c made in the rigid structure 5. Furthermore, the hollow plug 17 or more exactly its side walls 17b may equally serve as a guidance surface for the hook of the child seat 8 when it is anchored onto the anchor rod 12. Furthermore, the distance separating the two side walls 17b of the hollow plug 17 may equally be determined as being substantially identical to the width of the hook so as to eliminate any lateral play of the hook on the current portion of the anchor rod 12 needed for anchoring the said hook.

Thus, the rigid plate 11 attached to the front face 5a of the rigid structure 5 of the backrest 3 is used to locally increase the strength of the rigid structure 5 while allowing the forces exerted on the anchor rod 12 to be accepted via the retention means 14. The anchor rod 12 may therefore simply be fitted onto the rigid plate 11 by means of non-load-bearing spot welds, that is to say by spot welds which do not participate in accepting the forces in the event of heavy stresses exerted by the hook of the child seat.

Naturally, the padding 6 and the trim cover 7 have a cut-out at the rear face of the backrest 3 so as to allow accessibility to the anchoring system 10. The contour of the opening made in the cover 7 may for example be disposed between the front face 16b of the plate 16 of the protective element 15 and the rear face 5b of the rigid structure 5 then attached between these two elements when the retention members 19 of the protective element 15 are clipped onto the bent portions 20 of the rigid plate 11.

Further, as can be seen in FIG. 6, the lower part of the front face 16b of the plate may also have a relatively important surface to allow the apposition of reglementar and normalised logo 21 indicating the anchoring point of the hook 91 of the strap 9 belonging to the child seat 8. This front face 16b of the plate 16 of protective element 15 may also, according to its shape and dimensions, intended to be a trim for the rear face of the seat 1.

The invention claimed is:

1. Vehicle seat backrest suitable for allowing the attachment of a child seat, the backrest comprising a rigid structure having a front face and a rear face, the rigid structure being provided with a through hole delimited by a contour and an anchoring system comprising an anchor rod having a pair of ends and disposed on the side of the front face of the rigid structure, the anchor rod sized to extend across the through hole along a cross-direction between the pair of ends and adapted to permit a coupling member belonging to the child seat to be anchored on the anchor rod via the rear face of the rigid structure, the anchoring system further comprising a rigid plate provided with an opening, said plate being attached to the front face of the rigid structure and against the contour of the through hole so that the opening of the plate is disposed opposite the through hole of the rigid structure to allow the passage of the coupling member of the child seat, the anchor rod fitted onto the rigid plate and extending across the opening and positioned to interact with the coupling member of the child seat, wherein:

the rigid plate comprises retention means suitable for directly retaining the anchor rod by direct abutment contact with the anchor rod when the coupling member of the child seat exerts forces on the said anchor rod, the ends of the anchor rod are disposed on either side of the through hole of the rigid structure and on either side of the opening of the plate along the cross-direction, and the ends of the anchor rod are disposed opposite the contour of the rigid structure and the rigid plate.

2. Backrest according to claim 1, in which the retention means of the rigid plate protrude from the front face of the rigid structure.

3. Backrest according to claim 2, in which the retention means and the rigid plate are formed of a single piece.

4. Backrest according to claim 3, in which the retention means have the form of curved portions of the rigid plate.

5. Backrest according to claim 1, in which the anchor rod is attached to the rigid plate by means of attachment points which do not participate in the acceptance of forces in the event of stresses exerted by the coupling member of the child seat upon the said anchor rod.

6. Backrest according to claim 1, and including a protective element in which the protective element comprises retention members suitable for being attached to attachment members of the rigid plate when the protective element is inserted into the through hole of the rigid structure via the rear face of the rigid structure.

7. Backrest according to claim 1, in which the rigid plate is attached to the front face of the rigid structure by welding or screwing.

8. Vehicle seat comprising a seat and a backrest according to claim 1.

9. Vehicle seat backrest for allowing the attachment of a child seat, the backrest comprising:

a rigid structure having a front face and a rear face, the rigid structure being provided with a through hole delimited by a contour and an anchoring system comprising an anchor rod disposed on the side of the front face of the rigid structure, the anchor rod extending across the through hole and adapted to receive a coupling member belonging to the child seat to be anchored on the anchor rod via the rear face of the anchoring system further comprising a rigid plate provided with an opening, said plate being attached to the front face of the rigid structure and against the contour of the through hole so that the opening of the plate is disposed opposite the through hole of the rigid structure to allow the passage of the coupling member of the child seat, anchor rod fitted onto the rigid plate and extending across the opening to interact with the coupling member of the child seat, wherein:

the rigid plate comprises retention means suitable for retaining the anchor rod by abutment contact when the coupling member of the child seat exerts forces on the said anchor rod, and wherein the anchoring system also comprises a protective element which has a cavity with a bottom provided with a slot in which the anchor rod is housed when the protective element is inserted into the through hole of the rigid structure via the rear face of the rigid structure;

and further wherein the protective element comprises retention members suitable for being attached to attachment members of the rigid plate when the said protective element is inserted into the through hole of the rigid structure via the rear face of the rigid structure.

10. Vehicle seat backrest for receiving a strap of a child seat, the backrest comprising:
- a rigid structure having a front face, a rear face, and a through hole surrounded by a contour;
- an anchoring system including:
- a rigid plate having a rear face disposed adjacent the front face of the rigid structure and surrounding the through hole, the rigid plate having an opening sized to communicate with the through hole in the rigid structure;
- an anchor rod disposed adjacent a front face of the rigid plate and extending across the opening, the anchor rod having a pair of ends, each of the ends secured to the rigid plate, the anchor rod adapted to receive a coupling member carried by the strap of the child seat; and
- the front face of the rigid plate having a protruding zone including a flat, the flat comprising an abutment surface for receiving forces applied through the anchor rod.

11. The backrest of claim 10, wherein the opening of the rigid plate is sized to substantially correspond to the through hole in the rigid structure.

12. The backrest of claim 11, including a protective shell sized for insertion through the through holes and the opening, the protective shell including a slot sized to fit over the anchor rod, and wherein the rigid plate includes a plurality of attachment members sized to engage a plurality of retention members carried by a protective shell for securing the protective shell to the rigid plate.

* * * * *